(12) United States Patent
Belliveau

(10) Patent No.: US 6,491,276 B1
(45) Date of Patent: Dec. 10, 2002

(54) ADJUSTABLE HIGH-LOW LOCKING LAPTOP COMPUTER MOUNT

(76) Inventor: Robert J. Belliveau, 1 "A" St., Apt. 504, Hull, MA (US) 02045-1972

( * ) Notice: Subject to any disclaimer, the term of this patent is extended or adjusted under 35 U.S.C. 154(b) by 0 days.

(21) Appl. No.: 09/482,228

(22) Filed: Jan. 13, 2000

Related U.S. Application Data

(60) Provisional application No. 60/158,477, filed on Oct. 8, 1999.

(51) Int. Cl.[7] .............................................. A47G 29/00
(52) U.S. Cl. .................... 248/372.1; 248/420; 248/920; 108/138; 108/147
(58) Field of Search .............................. 248/372.1, 420, 248/920, 921, 922, 923, 924, 918; 108/147, 144.11, 138; 361/680, 681, 682, 683

(56) References Cited

U.S. PATENT DOCUMENTS

| | | | |
|---|---|---|---|
| 3,237,921 A | * | 3/1966 | Jay |
| 4,703,701 A | * | 11/1987 | Sema |
| 4,714,028 A | * | 12/1987 | Uredat-Neuhoff |
| 4,790,611 A | * | 12/1988 | Craner |
| 4,953,256 A | * | 9/1990 | Salmela et al. ................ 16/201 |
| 5,240,215 A | | 8/1993 | Moore ......................... 248/278 |
| 5,450,800 A | * | 9/1995 | Leonard ........................ 108/7 |
| 5,551,616 A | * | 9/1996 | Stitt et al. |
| 5,555,491 A | * | 9/1996 | Tao |
| 5,632,462 A | | 5/1997 | Kallas ..................... 248/286.1 |
| 5,673,628 A | * | 10/1997 | Boos |
| 5,751,548 A | | 5/1998 | Hall et al. .................. 361/686 |
| 5,988,029 A | * | 11/1999 | Rottermann et al. |
| 6,015,198 A | * | 1/2000 | Stairs |
| 6,021,720 A | * | 2/2000 | Boos et al. |
| 6,220,660 B1 | * | 4/2001 | Bedro et al. .................. 108/44 |

FOREIGN PATENT DOCUMENTS

WO    WO 98/17501    4/1998

OTHER PUBLICATIONS

Law Enforcement Product News, vol. 10, No. 3, p. 70, May–Jun., 1999.

* cited by examiner

*Primary Examiner*—Korie Chan
(74) *Attorney, Agent, or Firm*—Fish & Richardson P.C.

(57) ABSTRACT

A computer mount for mounting a laptop computer in an automobile, such as a police or a public safety vehicle allows a computer to be quickly and easily moved to an out-of-the-way position (e.g., out of the deployed airbag zone) before moving the vehicle. Thus, while the vehicle is in motion the mount is kept low, out of the airbag zone. When the car is stopped, the mount is quickly and easily raised up and brought to a convenient ergonomic position for typing.

10 Claims, 8 Drawing Sheets ional Application Ser. No. 60/158,477, filed on Oct. 8, 1999.
ADJUSTABLE HIGH-LOW LOCKING LAPTOP COMPUTER MOUNT

CROSS-REFERENCE TO REALTED APPLICATIONS

This application claims priority from U.S. Provisional Application Ser. No. 60/158,477, filed on Oct. 8, 1999.

BACKGROUND OF THE INVENTION

This invention relates to laptop computer mounts and more particularly to laptop computer mounts for use in all types of vehicles.

The use of portable computers (e.g., laptop computers) is widespread. In certain applications, portable computers are brought into vehicles, used temporarily and then removed for use elsewhere. For example, in law enforcement, an increasing number of police vehicles are equipped with laptop computers to allow the police officer to enter or retrieve data relating to the operator of a motor vehicle.

In some cases, particularly where the driver is the sole occupant of the vehicle, the passenger seat is used as a work surface for the computer. Of course, doing so comes at the expense of sacrificing the passenger seat, an impractical option in most cases. Using the passenger seat as a working surface is impossible when the vehicle has two occupants in the front seats. For vehicles used only with single occupants, the passenger seat area can be modified to form a more appropriate working surface. Even in this situation, the seated driver must twist into an uncomfortable position to use the computer.

Other solutions to this problem have been sought in the form of brackets allowing the computer to be attached to various parts of the car including the steering column or console. However, the vehicle cannot safely be driven with the device in place because deployment of air bags could damage the computer and/or cause injury to the vehicle's occupants. Additionally, assembling and disassembling the computer and brackets before and after each use can be time consuming.

SUMMARY OF THE INVENTION

The invention features a mount for use in a vehicle (e.g., an automobile) which is comfortably accessible when the vehicle is not moving and can be quickly and easily moved and safely locked into an "out-of-the-way" position before the vehicle is moved. In other words, when the car is stopped, the mount is quickly and easily raised up in a single action to a convenient ergonomic position for typing. On the other hand, just prior to moving the car, the computer can be quickly repositioned in a single action out of the deployed air bag zone.

In one aspect, the invention features a computer mount assembly including a biasing element, a rail assembly, and a mount having a surface for receiving a computer. The mount is connected to a second end of the rail assembly and to a second end of the biasing element, and is slidably movable in a single action between an up position and a down position relative to a first end of the rail assembly and a first end of the biasing element. The single action design allows an occupant of the vehicle to reposition the mount with only one hand instantaneously.

Embodiments of the invention may include one or more of the following.

The mount is further configured to be slidably movable in a single action to a plurality of positions between the up position and the down position. Additionally, surface of the mount is adjustable, i.e., tiltable and swivelable. The plurality of positions and surface adjustability allows occupants of different size to move the mount into multiple ergonomic positions. The computer mount assembly further includes a housing to which both the first end of the biasing element and the first end of the rail assembly are connected. A pin is attached to the housing and configured to engage the mount in a plurality of positions.

The biasing element and the rail assembly are positioned relative to a base of the housing to reduce the effective amount of force needed to compress the biasing element, e.g., to about 60% of the end-on force. The biasing element and the rail assembly are attached to the mount at an angle relative to a base of the housing creating an incline plane thereby reducing the effective amount of force necessary to compress the biasing element. The angle between the base and the rail assembly is fixed, e.g., about 45 degrees, whereas the angle between the base and the biasing element varies, e.g., between about 0 to about 40 degrees, as the mount is moved between the up position and the down position. The variable angle design allows longer biasing elements to be used in the assembly without needing to increase the overall height of the assembly in the down position.

The rail assembly includes a first member at the first end and a second member at the second end. The second member is slidable in a direction parallel to a longitudinal axis of the first member to a plurality of positions between the up position and the down position by engaging a pin attached to the housing with the mount. The mount is slidably movable between about 6 to about 15 inches away from the housing at an angle of between about 30 degrees to about 60 degrees relative to a base of the housing.

The mount includes adjustable members configured to secure a computer to the surface of the mount. At least one of the adjustable members is secured to the surface with a locking mechanism to protect the computer from theft.

In certain embodiments, the computer mount can be instantly positioned up and toward the rear of the vehicle (e.g., about 8 inches on an angle of about 45 degree) in adjustable increments of about 1 inches to place the computer in a convenient typing location. The mount swivels and tilts for convenient operation and viewing of the computer.

Other features and advantages of the invention will be apparent from the drawings, the following Detailed Description, and the claims.

DETAILED DESCRIPTION

Figure 1:
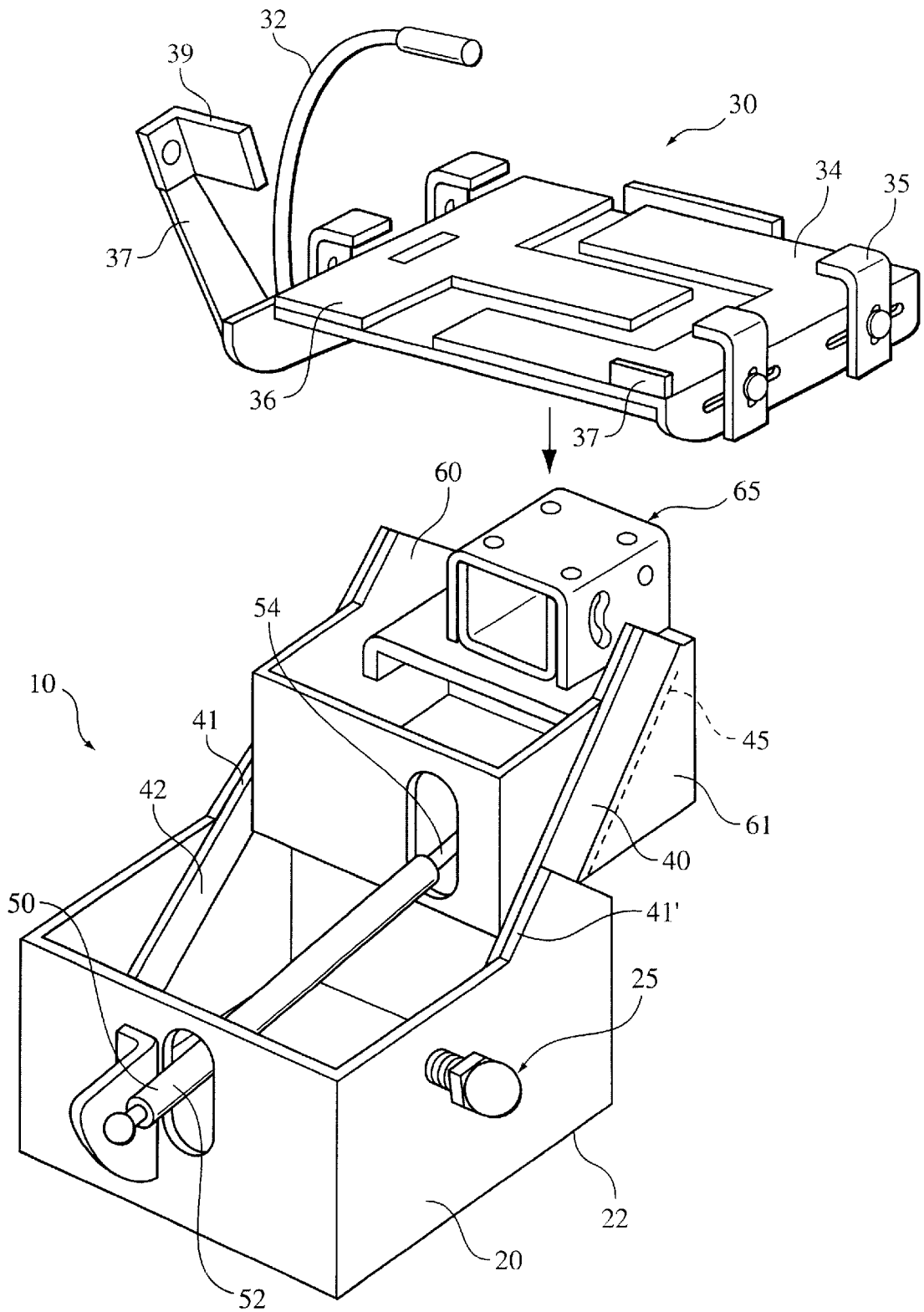
FIG. 1 is a partially exploded perspective view of a computer mount in a raised position with a locking laptop computer mount separated from a lower unit of the computer mount.

Referring to FIG. 1, a mounting unit 10 includes a lower assembly 20 and an intermediate assembly 60 with an adjustable mount 65. Mounting unit 10 also includes a locking support platform 30 connected to adjustable mount 65 but is shown disconnected here for easier viewing of the components of mounting unit 10. Mounting unit 10 is installed over the transmission tunnel of an automobile (not shown) by fastening lower assembly 20 to any support member of the automobile, e.g., floor boards, frame or auxilary brackets.

Lower assembly 20 includes a rail assembly 40 and a plunger 50 (e.g., a gas spring), both of which connect to intermediate assembly 60 and are used to translate intermediate assembly 60 up and away from lower assembly 20. Rail assembly 40 is in the form of a pair of ball bearing drawer slides 42 attached on sides 41 and 41' of mounting unit 10 and is described in more detail below. Plunger 50 includes a central piston 54 having one end received within a compressed gas cylinder 52 and an opposite end attached to intermediate assembly 60 (not shown). Compressed gas within cylinder 52 applies an outward force to central piston 54 thereby forcing intermediate assembly 60 to translate along rail assembly 40.

Intermediate assembly 60 includes an outer surface 61 having a series of stops 45 that engage a locking pin 25 mounted on an outer surface 21 of lower assembly 20 such that intermediate assembly 60 is translatable to several different lengths. Typically, rail assembly 40 and plunger 50 are configured to translate intermediate assembly 60 in about 1 inch increments to a full translation between about 6 to about 15 inches at an angle relative to a base 22 of lower assembly 20 between about 30 to about 60 degrees.

Figure 2:
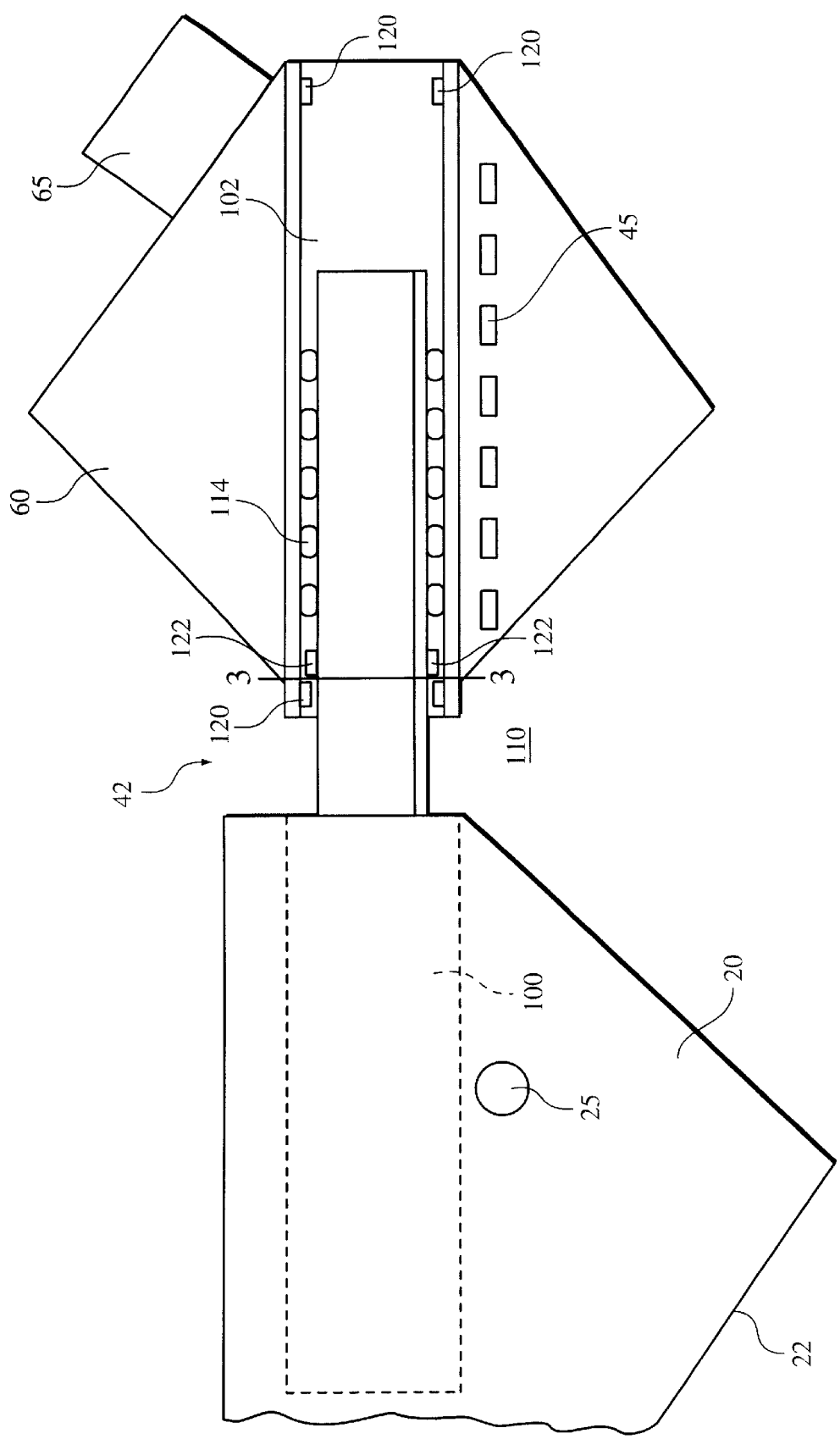
FIG. 2 is a schematic side view of a rail assembly in an extended position.
Figure 3:
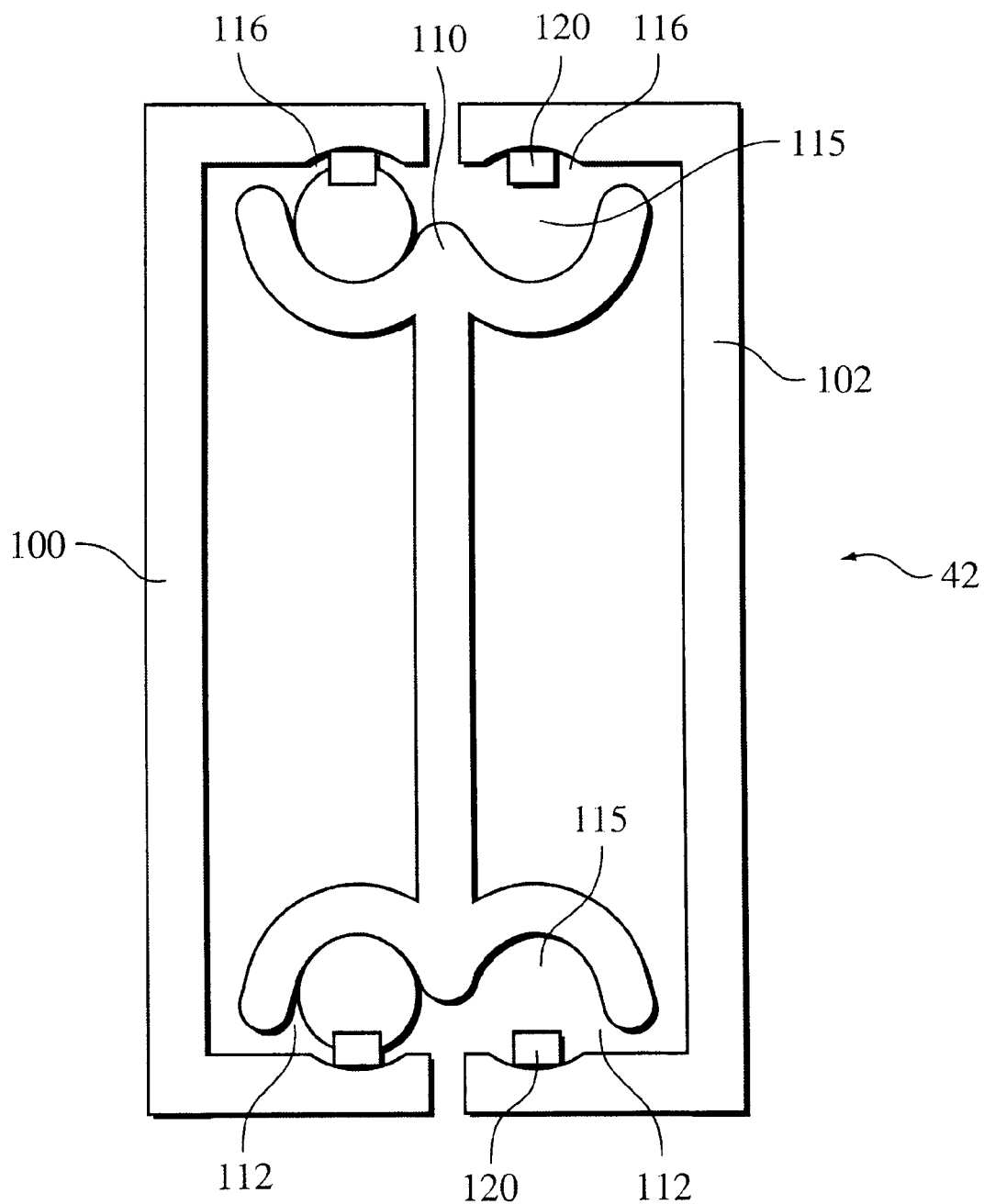
FIG. 3 is an end-on cross-sectional view of the rail assembly shown in FIG. 2 taken along line 3—3.

Referring to FIGS. 2 and 3, each drawer slide 42 of rail assembly 40 includes an outer rail 100 attached to lower assembly 20 and an inner rail 102 attached to intermediate assembly 60. Both outer rail 100 and inner rail 102 are movably secured on opposite sides of a central rail 110. Central rail 110 acts as a track on which outer rail 100 and inner rail 102 translate in parallel but opposite directions. Intermediate assembly 60, central rail 110 and inner rail 102 translate, in telescope fashion, with respect to outer rail 100 which is held stationary by lower assembly 20.

Central rail 110 contains channels 112 (FIG. 3) which run parallel to each other along the longitudinal length of central rail 110. Similarly, outer rail 100 and inner rail 102 each include channels 116 (FIG. 3) running parallel to both each other and channels 112. When central rail 110 is sandwiched between outer rail 100 and inner rail 102 (FIG. 3), channels 112, 116 extend along the longitudinal axis of drawer slides 42. Bearings 114 are placed in channels 112, 116 to reduce the friction as inner rail 102 and central rail 110 telescope relative to outer rail 100. Mechanical stops 120 (FIG. 2) on rails 100, 102 protrude into channels 116 to maintain bearings 114 therein. Central rail 110 also includes mechanical stops 122 protruding into channel 116 to prohibit inner rail 102 and outer rail 100 from being fully translated off of central rail 110. For example, when rail assembly 40 is translated to the full open position, stops 122 abut stops 120.

Rail assembly 40 can be obtained from Accuride, located in the United States, as Model number 2632.

Figure 4:
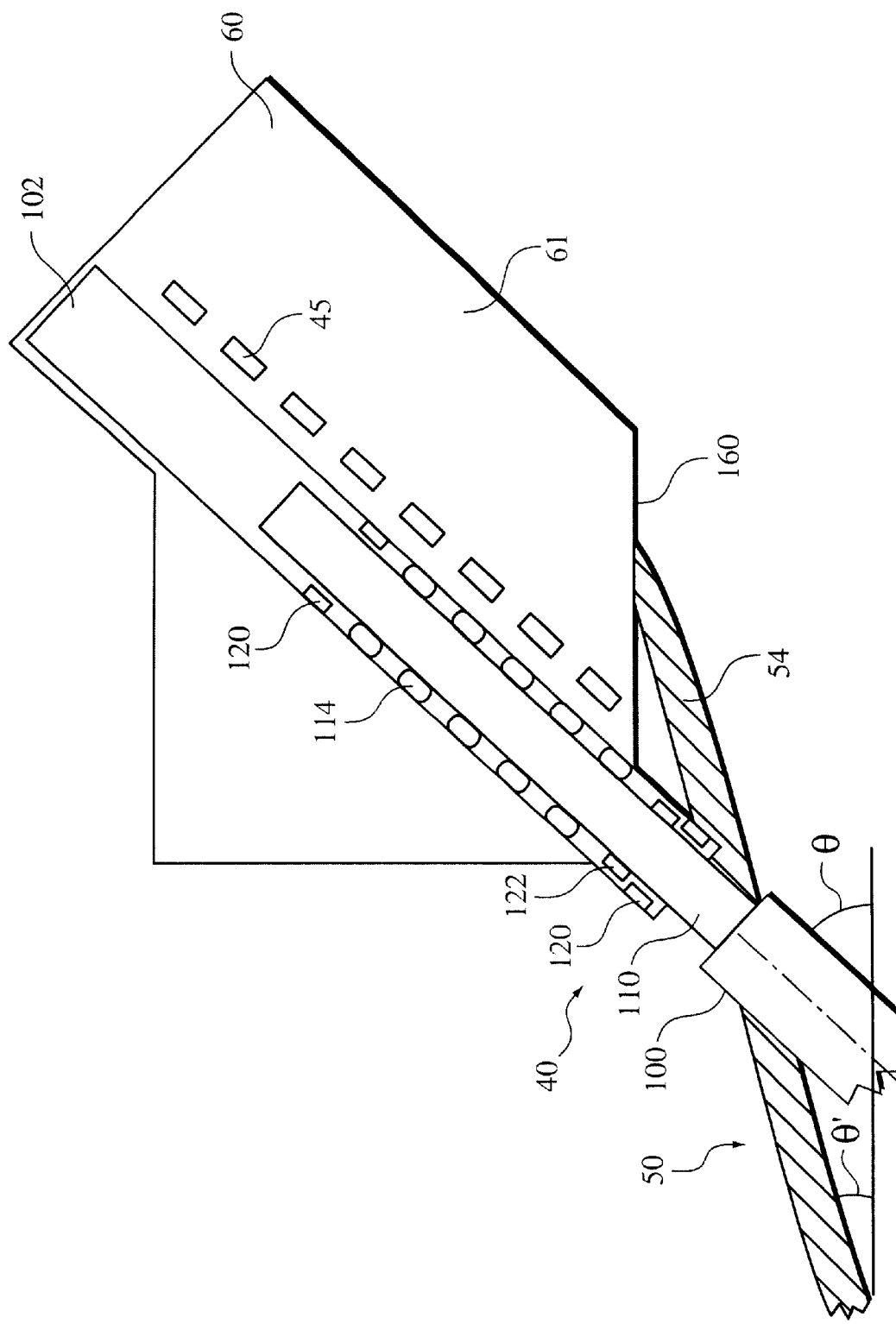
FIG. 4 is a side-on schematic view of the intermediate assembly, rail assembly, and plunger shown in FIG. 1.

Referring to FIG. 4, inner rail 102 is attached to intermediate assembly 60 and outer rail 100 is attached to lower assembly 20 (not shown). Central piston 54 of plunger 50 attaches to a bottom portion 160 of intermediate assembly 60 to force the intermediate assembly away from lower assembly 20 by telescoping inner rail 102 and central rail 110 relative to outer rail 100.

The angle, θ, between the base of the lower assembly and each rail assembly 40 is between about 30 to about 60 degrees, whereas the angle, θ', between plunger 50 and the base of lower assembly varies between about zero degrees and about 40 degrees depending on the open position of the computer mount. In a fully extended open position, θ' is about 40 degrees. In a fully compressed closed position, θ' is about zero degrees. The incline plane formed by the relative angles of plunger 50 and rail assembly 40 reduces the overall force necessary to compress plunger 50 and thereby translate intermediate assembly 60 along each rail assembly 40 down towards lower assembly 20. In general, the incline plane configuration, described above, reduces the effective amount of force needed to compress plunger 50 to about 60% of the end-on force. For example, a plunger requiring about 20 pounds of end-on force when placed in the above configurations can be compressed by applying about 12 pounds of force normal to top surface of the intermediate assembly. Of course, plunger 50 can be made with different end-on compression forces and the relative angles, θ and θ', adjusted to reduce the effective amount of compression force needed to translate intermediate assembly 60 towards lower assembly 20.

Figure 5:
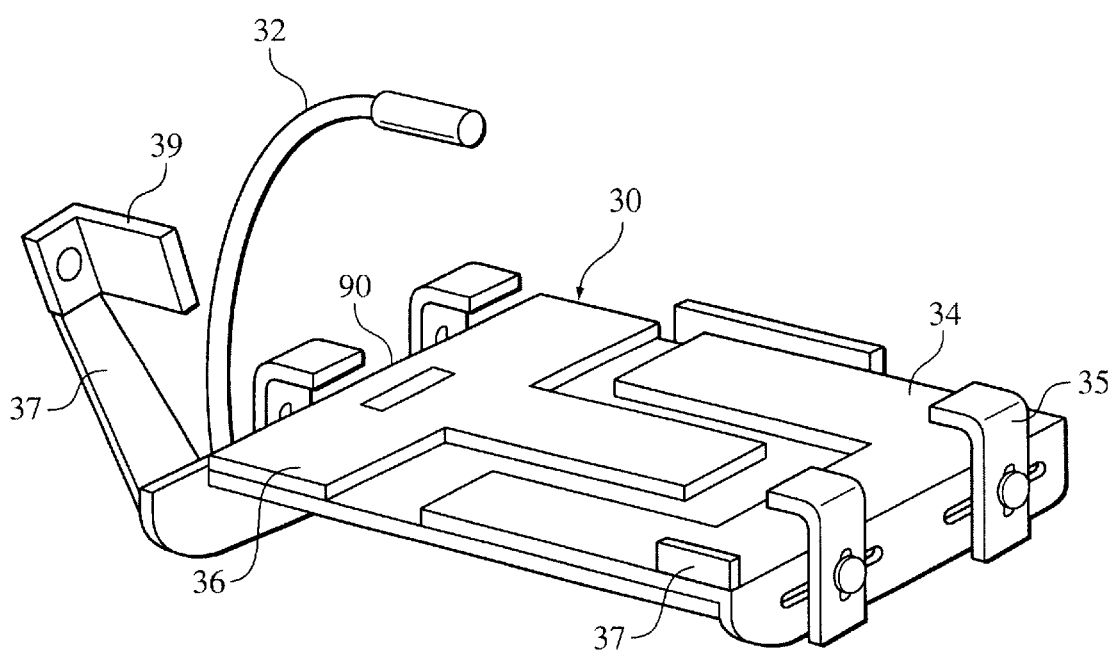
FIG. 5 is an exploded perspective view of the locking laptop computer mount shown in FIG. 1.

Referring to FIG. 5, locking support platform 30 includes locking side clips 35 which move to accommodate eight differences of laptop computers. Platform 30 also includes a U-shaped section 34 and a mating, T-shaped section 36 which are movable apart from one another in a horizontal direction to accommodate differences in the length of the laptop computer. Differences in the width of the laptop computer are accommodated by adjusting a movable stop 37 of U-shaped section 34. Once the platform 30 has been adjusted to accommodate the computer, U-shaped section 34 is secured, e.g., with bolts (not shown), and T-shaped section 36 is secured with a locking mechanism 90 (FIG. 7), to a base of platform 30 (not shown). Locking mechanism 90 allows T-shaped section 36 to be slidably moved in the horizontal direction (arrows), such that the computer can be easily removed and replaced onto platform 30. Platform 30 also can include a high intensity lamp 32 and a screen support member 37 having a face 39 which attaches to a laptop computer screen (not shown) to support and steady the screen.

Figure 6:
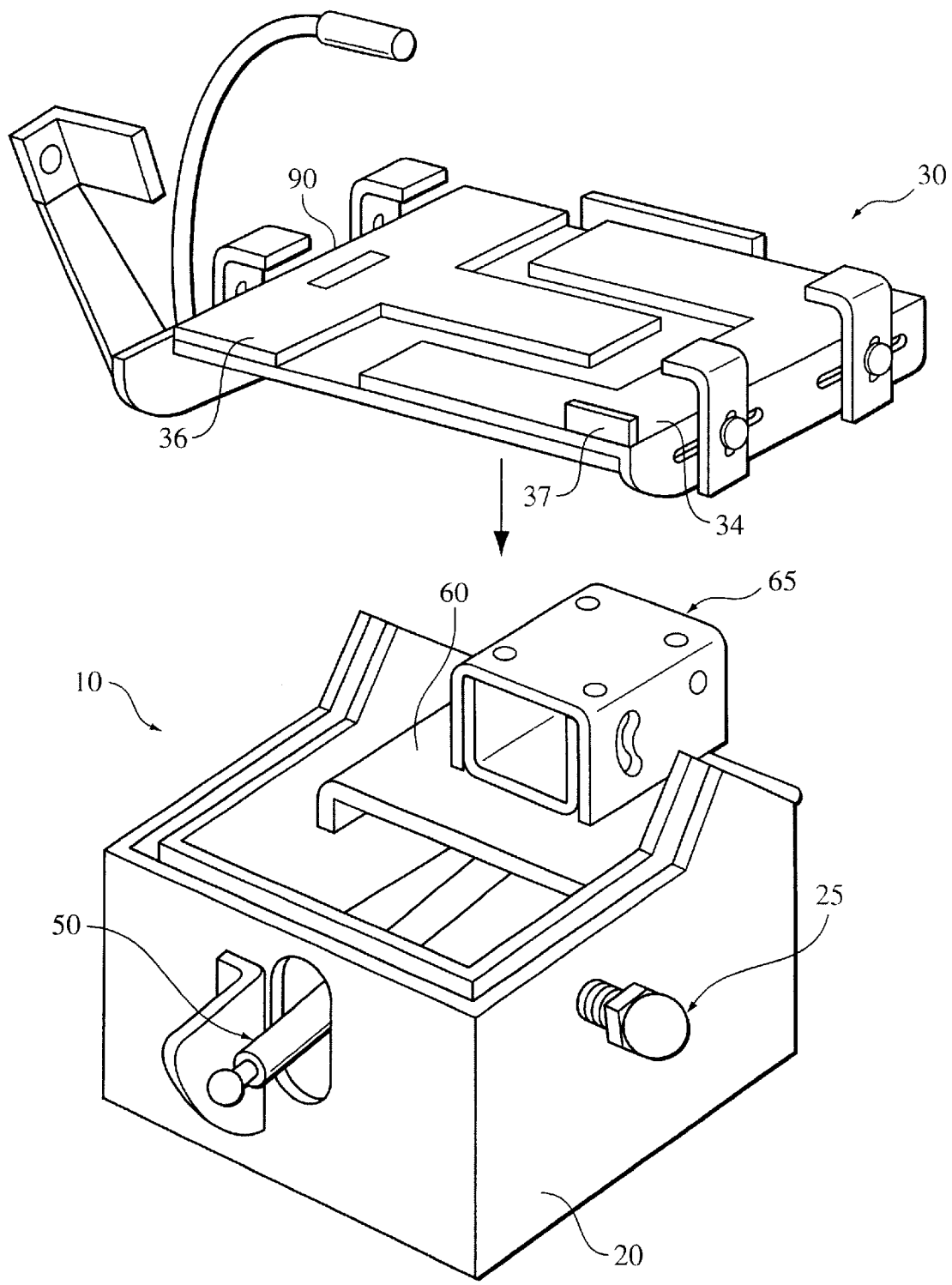
FIG. 6 is an exploded perspective view of a computer mount in the low (down) locked position as viewed from a driver facing he dashboard of the vehicle.

FIG. 6 shows mounting unit 10 in the low or closed position (e.g., placed beneath the dashboard, as viewed from the driver's side, toward the rear of the vehicle) with the locking support platform 30 removed for easier viewing of the mounting unit components. To release the computer mount from a low to high or open position, the locking pin 25 (e.g., located on the left of the base of the mount at the driver's side), is pulled away from the lower assembly to allow plunger 50 to translate the intermediate assembly 60 along rail assembly 40.

Figure 7:
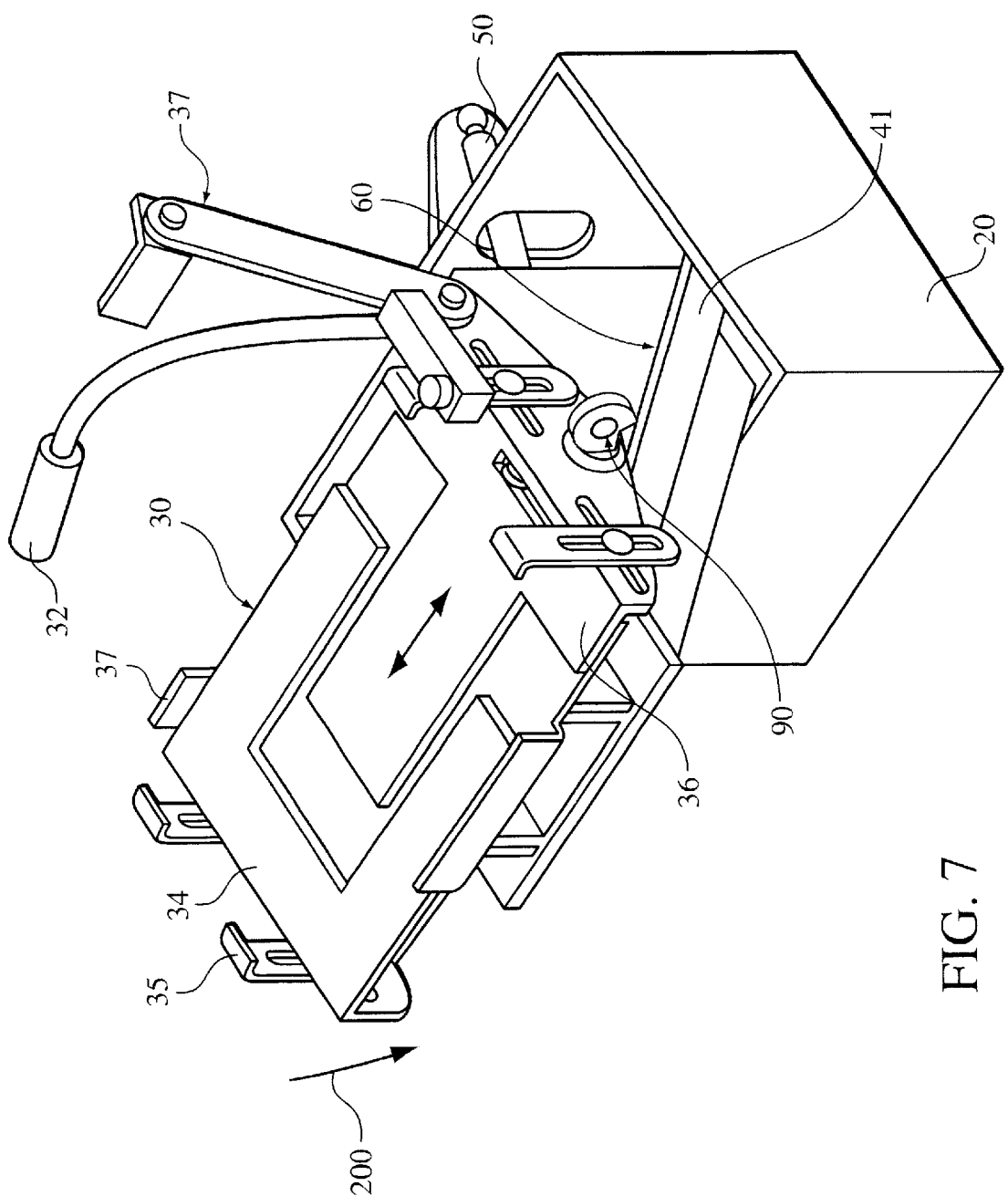
FIG. 7 is an exploded perspective view of a computer mount in the high (Up) raised position as viewed from the passenger seat facing the dashboard.

Referring to FIG. 7, the mounting unit is repositioned to a low position (e.g., out of a deployed air bag zone), by simply pushing locking support platform 30 in a downward manner, arrow 200, until the intermediate assembly reaches its closed position (FIG. 6). The entire procedure is accomplished in seconds. In the lowest position, intermediate assembly 60 and rail assembly 40 are received within lower assembly 20.

Figure 8:
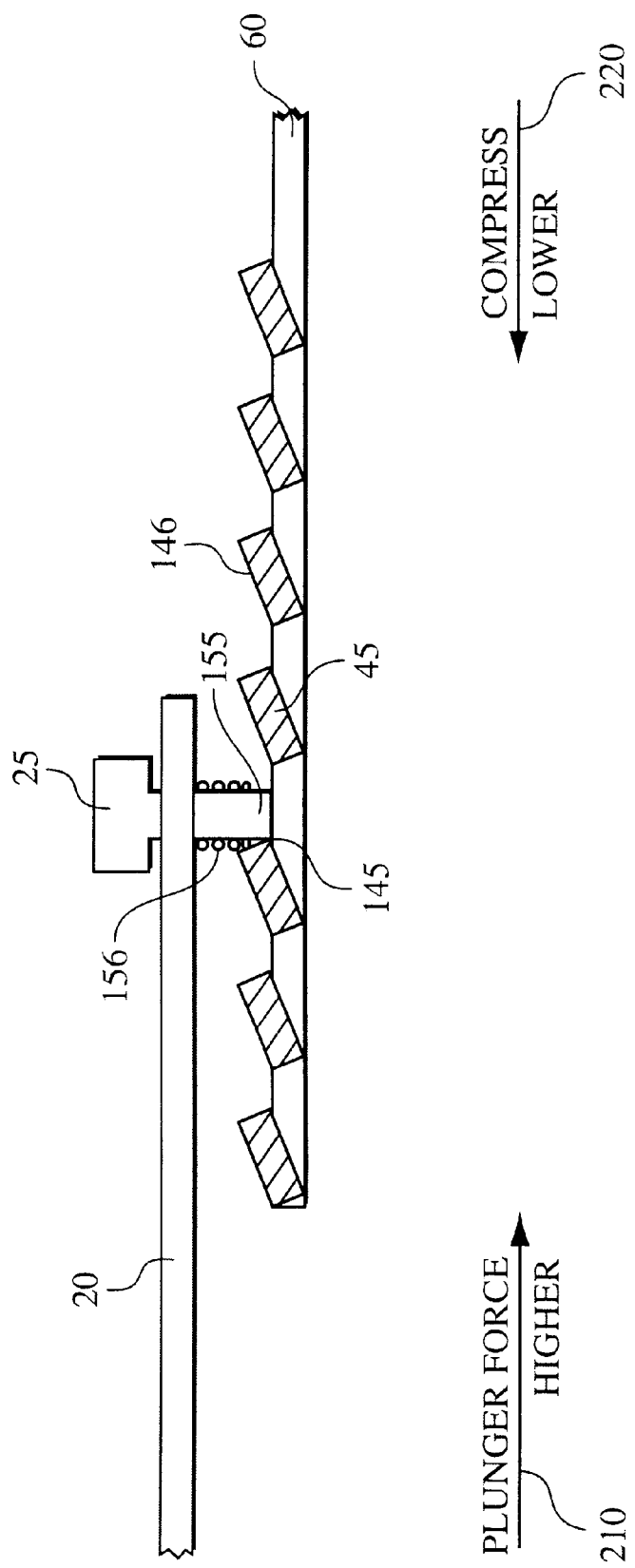
FIG. 8 is an exploded over-head perspective view of the locking pin engaging the intermediate assembly of the computer mount.

Referring to FIG. 8, mounting unit 10 is adjustable to intermediate positions, i.e., between the low and high positions, by engaging locking pin 25 with one of stops 45 on intermediate assembly 60. For ease of viewing, only a portion of the lower and intermediate assemblies are shown. In an intermediate position, the force (arrow 210) from plunger 50 (not shown), i.e., urging intermediate assembly 60 towards the highest position, causes a surface 145 of stops 45 to abut an end 155 of pin 25. If a higher intermediate position is desired, pin 25 is pulled to disengage end 155 from surface 145 and the plunger forces intermediate assembly 60 to a higher position. At the desired height, pin 25 is released and spring 156 urges end 155 back toward stops 45. Alternatively, if a lower position is desired, the operator simply compresses (arrow 220) intermediate assembly to the desired height. As the operator compresses, end 155 slides over a top surface 146 of stops 45 while spring 156 forces end 155 towards intermediate assembly 60.

When the laptop computer is in either the high or low position, the locking adjustable computer mount keyboard can be tilted, swiveled in either direction or repositioned for use by either the operator or the passenger of a vehicle.

While the mounting unit has been designed at the outset for vehicles, the mount has the ability to expand, thereby making it capable of being utilized out of the vehicle as well; in cramped spaces in an office setting or to enhance ergonomic portability, for example.

Still other embodiments are within the scope of the claims.

What is claimed is:

1. A computer mount assembly comprising:
   a biasing element having a first end and a second end;
   a rail assembly having a first end and a second end;
   a mount having a surface for receiving a computer, the mount being connected to the second end of the rail assembly and to the second end of the biasing element, the mount being slidably movable in a single action between an up position and a down position relative to the first end of the rail assembly and the first end of the biasing element; and
   a housing, wherein the first end of the biasing element and the first end of the rail assembly are connected to the housing;
   a first angle between a base of the housing and the rail assembly is fixed and a second angle between the base and the biasing element varies as the mount is moved between the up position and the down position.

2. A computer mount assembly comprising:
   a biasing element having a first end and a second end;
   a rail assembly having a first end and a second end, the rail assembly includes a first member at the first end and a second member at the second end, the second member being slidable in a direction parallel to a longitudinal axis of the first member;
   a mount having a surface for receiving a computer, the mount being connected to the second end of the rail assembly and to the second end of the biasing element, the mount being slidably movable in a single action between an up position and a down position relative to the first end of the rail assembly and the first end of the biasing element, the mount is configured to move from the up position to the down position when a downward force is applied to the surface for receiving the computer; and
   a housing, wherein the first end of the biasing element and the first member of the rail assembly are connected to the housing.

3. The computer mount assembly of claim 2, further comprising a pin attached to the housing, the pin configured to engage the mount.

4. The computer mount assembly of claim 3, wherein the pin is configured to engage the mount in a plurality of positions.

5. The computer mount assembly of claim 4, wherein the mount is slidably movable to a plurality of positions between the up position and the down position by engaging the pin with the mount.

6. A computer mount assembly comprising:
   a biasing element having a first end and a second end;
   a rail assembly having a first end and a second end;
   a mount having a surface for receiving a computer, the mount being connected to the second end of the rail assembly and to the second end of the biasing element;
   housing connected to the first end of the rail assembly and to the first end of the biasing element; and
   a pin attached to the housing, the pin configured to engage the mount in a plurality of positions,
   the mount being slidably movable in a single action between an up position and a down position relative to the housing, the biasing element and the rail assembly being positioned relative to a base of the housing to reduce the effective amount of force needed to compress the biasing element, the mount is configured to move from the up position to the down position when a downward force is applied to the surface for receiving the computer.

7. A computer mount assembly comprising:
   a biasing element having a first end and a second end;
   a rail assembly having a first end and a second end;
   a mount having a surface for receiving a computer, the mount being connected to the second end of the rail assembly and to the second end of the biasing element; and
   a housing connected to the first end of the rail assembly and to the first end of the biasing element,
   the mount being slidably movable in a single action between an up position and a down position relative to the housing, the biasing element and the rail assembly being positioned relative to a base of the housing to reduce the effective amount of force needed to compress the biasing element, the mount is configured to move from the up position to the down position when a downward force is applied to the surface for receiving the computer and the mount includes a plurality of adjustable members configured to secure a computer to the surface of the mount.

8. The computer mount assembly of claim 7, wherein at least one of the adjustable members is secured to the surface with a locking mechanism.

9. A computer mount assembly comprising:

a biasing element having a first end and a second end;

a rail assembly having a first end and a second end;

a mount having a surface for receiving a computer, the mount being connected to the second end of the rail assembly and to the second end of the biasing element; and a housing connected to the first end of the rail assembly and to the first end of the biasing element, the mount being slidably movable in a single action between an up position and a down position relative to the housing, the biasing element and the rail assembly being positioned relative to a base of the housing to reduce the effective amount of force needed to compress the biasing element, a first angle between the base and the rail assembly is fixed and a second angle between the base and the biasing element varies as the mount is moved between the up position and the down position.

10. A computer mount assembly comprising:

a biasing element having a first end and a second end;

a rail assembly having a first end and a second end;

a mount having a surface for receiving a computer, the mount being connected to the second end of the rail assembly and to the second end of the biasing element; and a housing connected to the first end of the rail assembly and to the first end of the biasing element, the mount being slidably movable in a single action between an up position and a down position relative to the housing, the biasing element and the rail assembly being positioned relative to a base of the housing to reduce the effective amount of force needed to compress the biasing element, the mount is configured to move from the up position to the down position when a downward force is applied to the surface for receiving the computer and the rail assembly includes a first member at the first end and a second member at the second end, the second member being slidable in a direction parallel to a longitudinal axis of the first member.

* * * * *